United States Patent
Mundhada et al.

(10) Patent No.: US 10,339,200 B2
(45) Date of Patent: Jul. 2, 2019

(54) SYSTEM AND METHOD FOR OPTIMIZING MIXED RADIX FAST FOURIER TRANSFORM AND INVERSE FAST FOURIER TRANSFORM

(71) Applicant: Signalchip Innovations Private Limited, Bangalore (IN)

(72) Inventors: Rajesh Mundhada, Bengaluru (IN); Pramod Udupa, Bengaluru (IN)

( * ) Notice: Subject to any disclaimer, the term of this patent is extended or adjusted under 35 U.S.C. 154(b) by 47 days.

(21) Appl. No.: 15/288,548

(22) Filed: Oct. 7, 2016

(65) Prior Publication Data
US 2017/0103042 A1 Apr. 13, 2017

(30) Foreign Application Priority Data
Oct. 9, 2015 (IN) .............................. 5425/CHE/2015

(51) Int. Cl.
*G06F 17/14* (2006.01)
(52) U.S. Cl.
CPC ................................. *G06F 17/142* (2013.01)
(58) Field of Classification Search
CPC ............................. G06F 17/142; G06F 17/144
See application file for complete search history.

(56) References Cited

U.S. PATENT DOCUMENTS

| | | | |
|---|---|---|---|
| 2010/0070551 A1* | 3/2010 | Chen .................. | G06F 17/142 708/404 |
| 2010/0106759 A1* | 4/2010 | Chen .................. | G06F 17/142 708/404 |
| 2012/0254273 A1* | 10/2012 | Asanaka ............ | G06F 17/142 708/404 |
| 2015/0331634 A1* | 11/2015 | Salishchev ......... | G06F 3/0673 711/149 |

* cited by examiner

*Primary Examiner* — Chuong D Ngo

(57) ABSTRACT

A system for implementing a mixed radix fast fourier transformation is disclosed. The system includes a data source 202, a digit-reverse address generator 204, a data memory 206, a register array 208, a control unit 210, a butterfly extraction unit 212, a twiddle factor generator 214, and a computation unit 216. The data source 202 provides input data. The digit reverse address generator 204 processes the input data (i) to generate a digit reverse index and performs a digits reverse address calculation. The data memory 206 stores the input data. The register array 208 includes one or more registers that are configured to cache multiple data words. The control unit 210 includes of identifying butterfly operations and generate addresses for fetching/storing data. The butterfly extraction unit 212 extracts data samples. The twiddle factor generator 214 generates and outputs a twiddle factors based on the current radix and radix configuration. The computation unit 216 performs twiddle factor multiplications and the butterfly operations for current radix.

16 Claims, 11 Drawing Sheets

SYSTEM AND METHOD FOR OPTIMIZING MIXED RADIX FAST FOURIER TRANSFORM AND INVERSE FAST FOURIER TRANSFORM

CROSS-REFERENCE TO RELATED APPLICATIONS

This application claims priority to Indian patent application no. 5425/CHE/2015 filed on Oct. 9, 2015, the complete disclosure of which, in its entirely, is herein incorporated by reference.

BACKGROUND

Technical Field

The embodiments herein generally relate to a fourier analysis, more particularly to a system and method for optimizing mixed radix fast Fourier transform (FFT) and inverse fast Fourier transform (IFFT).

Description of the Related Art

Discrete Fourier Transform (DFT) is one of the most used transforms for analysis/synthesis of discrete time domain signals. Fourier analysis converts a signal from time domain to a representation in the frequency domain and vice versa. Consider discrete complex numbers $x_0, x_1, x_2, \ldots x_{(N-1)}$. The DFT of the discrete complex numbers is defined by formula:

$$x[k] = \sum_{n=0}^{N-1} x[n] \cdot e^{\frac{-j2\pi nk}{N}} \qquad \text{Eq. 1}$$

Where $k=0, 1, \ldots, (N-1)$ is the frequency index, $n=0, 1, \ldots, (N-1)$ is the time index, $$e^{\frac{-j2\pi nk}{N}}$$

is the twiddle factor co-efficient. Computation of DFT using Eq. 1 requires $O(N^2)$ operations. Inverse Discrete Fourier Transform (IDFT) uses the same formula as Eq. 1, with the exception of sign reversal for the twiddle factor co-efficient. IDFT computation can be done by using DFT equation, by using swapping real and imaginary parts at the input and then swapping them again after DFT operation. This property holds good independent of the method used for implementation of DFT. Since IDFT has the same computation structure as DFT, all optimization proposed for DFT computation are directly applicable for IDFT and hence in further discussion only DFT is mentioned with the assumption that all optimizations applicable for DFT can be used for IDFT also.

A fast Fourier transform (FFT) is an algorithm that computes the discrete Fourier transform (DFT) of a sequence. FFT rapidly computes such transformations by factorizing the DFT matrix into a product of sparse (mostly zero) factors. As a result, it manages to reduce the complexity of computing the DFT from $O(N^2)$, which arises if one simply applies the definition of DFT, to $O(N \log N)$, where N is the data size, by elimination of trivial twiddle factor multiplications. FFT algorithm thus computes the DFT of a sequence, at a lower computational complexity compared to Eq. 1. Due to such complexity reduction in computation, it has made real-time signal processing possible in embedded systems in the domain of digital communications, image processing, video, audio and the like.

For a sequence of size N, FFT is calculated by factorizing $N=N_1*N_2*N_3 \ldots N_n$, where 'n' is the number of FFT stages, $(N_1, N_2, N_3, \ldots, N_n)$ are radix of the stages of FFT. Based on the values of $N_1, N_2, \ldots N_n$ used for factorizing, different types of FFT may be employed. The types of FFTs may include for example, (i) same radix FFT, (ii) split-radix FFT, (iii) mixed radix FFT, and the like. The same radix FFT involves factorization of N-sized FFT performed using only one value of radix. For example:—For $N_1=N_2= \ldots =N_n=2$, $N=2^n$, it results in radix-2 FFT, which is known to one skilled in the art. Similarly, radix-4/8 FFT is oblivious to one skilled in the art. The advantage of radix-2/4/8 FFTs is that most of the twiddle factors are unity, and hence the number of twiddle factor multiplication operations is reduced. The split-radix FFT involves factorization of N-sized FFT performed using a mixture of radix-2/4/8. The split-radix FFT is performed to reduce the number of stages for large FFT sizes, compared to using only radix-2 for factorization. For Example: $N=256=2*2*4*8$ may be decomposed into $N_1=N_2=N_3=2$, $N_4=4$, $N_5=8$, $N=2^3*4^1 8^1$. Mixed-radix FFT involves factorization of N-sized FFT performed using power of 2 (such as radix-2/4/8) and non-power of 2 (such as radix-3/5/7).

The factorization using arbitrary radix leads to huge flexibility in choice of FFT size, but non-power of 2 FFT computations require more operations than power of 2 FFT computations. For Example: $N=180=3*3*4*5$, can be decomposed into $N_1=3$, $N_2=3$, $N_3=4$, $N_4=5$, in case of mixed-radix FFT. If only power of 2 radix is used, then minimum 256-point had to be taken since next power of 2 is 256 for FFT size of N=180. The mixed-radix FFTs have gained popularity in communication systems, video processing domains where FFT size is not always of power of 2. The mixed-radix FFT decomposition allows more granularity in FFT sizes compared to using only power of 2 sizes, thereby allowing FFT sizes to be taken for only that number of samples, rather than zero-padding and subsequently taking higher size power of 2 FFT. However, support for any arbitrary radix increases computational complexity of FFT. For example, in long term evolution (LTE) standards, allocation of resources for user is done at a granularity of 12 sub-carriers or multiples of 12, thus requiring support for 12 and multiples of 12-point FFT, thus making mixed-radix FFT necessary. For LTE, the mixed-radix FFT allows fine grain control of resource allocation depending on bandwidth demand per user.

However, realization of the mixed-radix FFT solution compared to realization of power of 2 FFT is more challenging. The non-power of 2 radix sizes (such as 3/5/7) has a butterfly structure with internal multipliers, compared to radix-2, which has no internal multipliers in butterfly structure. Typically, computational unit will need to support multiple radices; which have different internal structures and consume different number of samples depending on radix. More importantly, keeping computation unit always busy with data to process becomes a bigger challenge since data access pattern from memory is different for every radix. The data access pattern is dependent on present radix stage and also ordering of radix i.e. radix configuration. The twiddle factors access pattern also keeps changing every stage, depending on current radix and radix configuration. Data organization to support efficient access for a range of FFT sizes and different combination of radix sizes makes it an important problem to solve to achieve efficient realization.

FIG. 1 illustrates a typical line diagram of a mixed-radix FFT solution according to a prior art. The system includes a control module 102, a data memory 104, and a computation unit 106. The data memory 104 holds the input data, intermediate output and final output. The computational unit 106 performs twiddle factor multiplication and radix dependent butterfly operation. The control module 102 generates schedule for reading/writing input data from data memory 104, the twiddle factor generator and the computation operation. The control module 102 also holds a radix configuration, such as which radix occurs in first stage, what is the total number of stages, size of FFT, and the like.

In the mixed-radix FFT, the computation unit 106 supports different radices. For example, in radix-5, 5 inputs are taken in and 5 outputs are given out. To support radix-5, 5 inputs have to be read and 5 outputs written, totally 10 memory access. It also needs 4 twiddle factors, leading to 4 twiddle factor complex values generated. The data may be provided in parallel, thus it puts a lot of pressure on memory to provide multiple inputs in parallel and write multiple outputs in parallel. Also, data has to be arranged in memory so that data is easily available for next stage butterfly. Data address access pattern changes at every stage for input and depends on radix configuration.

One of the presently known solutions to achieve parallel memory output is to partition memory into multiple banks, involving division of a single memory is into multiple smaller banks, where total memory size equals maximum FFT size supported. However, this results in area increase due to additional overhead of bank selection logic.

The addressing scheme for reading/writing data from multi-bank memory in case of mixed-radix FFT becomes complex, where it requires modulo operations for address computation. Furthermore, even if the banking is optimized for single size of FFT for data access and radix configuration, it may not work for different size. For supporting range of different radix (such as 2/3/4/5/7) of FFT, number of banks must be equal to maximum radix supported.

The computation unit 106 has to support multiple radix twiddle factor multiplication and butterfly operations. To provide high-throughput, average cycles taken for computation for each radix should be approximately equal, while keeping resource usage down. In several known techniques, the multiple memory banks may be used for parallel access to data, which will supply to multiple computation modules simultaneously. The addressing scheme for data ordering and access in multiple banks have been explored for meeting throughput requirements of applications like 3GPP LTE, which uses mixed-radix FFT for SC-FDMA transceiver chain. However, presently known techniques do not provide a single solution that address all the concerns in achieving high-throughput mixed-radix FFT including optimizing memory address access, computational unit optimization, and data ordering in memory.

SUMMARY

In the view of foregoing, an embodiment herein provides a system for implementing a mixed radix fast fourier transformation. The system includes a data source, a digit reverse address generator, a data memory, a register array, a control unit, a butterfly extraction unit, a twiddle factor generator, and a computation unit. The data source provides input data. The digit reverse address generator processes the input data to (i) generate a digit reverse index for a given radix configuration and a given size of a fast Fourier transformation (FFT), or (ii) generate a digit reverse index for the given radix configuration and the given size of an inverse fast Fourier transformation (IFFT), and performs a digits reverse address calculation by calculating weights of radix of each stage based on radix configuration. The data memory stores the input data (i) in a digit-reversed (DR) order based on the digits reverse address calculation and stores intermediate stage FFT outputs and final FFT output in normal order for decimation in time—fast Fourier transform (DIT-(I)FFT), and (ii) in a normal order and stores intermediate stage FFT outputs and final FFT output in digit-reversed (DR) order based on the digits reverse address calculation for decimation in frequency—fast Fourier transform (DIF-(I)FFT). The register array includes a one or more of registers. The one or more registers are configured to cache multiple data words includes intermediate values obtained from the data memory. The control unit includes of identifying butterfly operations based on a radix of a current stage for each radix configuration stage and generate addresses for fetching/storing data from a single bank memory to/from the register array. The butterfly extraction unit extracts data samples for butterfly operations from a multiple data words from the register array, based on the current radix and radix configuration. The twiddle factor generator generates and outputs a twiddle factors based on the current radix and radix configuration. The computation unit performs twiddle factor multiplications and the butterfly operations for current radix. The output of the computation unit is written back to the register array.

In an embodiment, the data memory is implemented as a single port, single bank memory where one or more samples are packed to a single memory data word, and the control unit generates selected data word addresses for fetching data word from the single bank memory and storing computed, immediate, and final results in the single bank memory.

In another embodiment, the one or more registers in the register array holds the input data words that consists of multiple data samples, before sending the input data samples to the computation unit, and holds output data samples of the computation unit and then writes the output data words consists of output data samples to the single bank memory. The single bank memory consists of a single port.

In yet another embodiment, the register array acts as a cache between the data memory and the computation unit.

In yet another embodiment, the butterfly extraction unit (i) extracts the data samples for the butterfly operations and the butterfly operations computations are performed on the computation unit and (ii) stores output data samples in the register array, and are written back to the data memory.

In yet another embodiment, (i) selecting the data words from the data memory, (ii) extracting the data samples for the butterfly operations for the computation unit, (iii) storing of computation unit output samples in the register array, and (iv) writing the data word back to the data memory are performed in parallel and in a pipelined manner to maximize data bandwidth utilization of the data memory and computation utilization of the computational unit.

In yet another embodiment, the twiddle factor generator generates a twiddle factor by using a look up table (LUT) storage. The look up table is optimized by using least common multiples (LCM) for all possible multiples of sizes of the twiddle factor. The least common multiples are required for every stage of each the FFT.

In yet another embodiment, the look up table (LUT) storage is optimized by storing one or more quadrants of sine and cosine information.

In yet another embodiment, the computation unit supports multiple radix butterfly computations. For long term evolution (LTE) the computation unit computes said FFT for at least one of (i) radix-2, (ii) radix-3, (iii) radix-4, or (iv) radix-5 configurations.

In yet another embodiment, the mixed radix FFT is computed by deriving at least one of a (i) number of the samples per said memory word, (ii) number of register arrays, (iii) number of parallel twiddle factors, and (iv) arrangement of the parallel twiddle factors.

In one aspect, a method for implementing a mixed radix fast Fourier transformation (FFT) is provided. The method includes the following steps: (a) determining a radix configuration based on a given size of a Fast Fourier transformation (FFT); (b) calculating a digit reverse addresses based on the determined radix configuration; (c) storing a one or more (input) data samples using the digit reverse addresses in a data memory; (d) grouping of all current stage butterfly data samples into a butterfly sets and a set of associated data words; (e) fetching a one or more data words from the data memory into a register array based on a current radix and said determined radix configuration; (f) performing a butterfly operation of the one or more input data samples; (g) writing the one or more data samples from a computation unit, back in place to said register array; and (h) performing an in place the data word write back from the register array to the data memory.

In one embodiment, the method includes for a second and subsequent radix stage is included. The method includes the following steps: (a) fetching a one or more of data words from the data memory to the register array based on a current radix and, the determined radix configuration; (b) giving the one or more data samples from the register array to the computation unit, wherein the one or more data samples is determined based on a current radix and a sequential radix position in the determined radix configuration; (c) performing a twiddle factor multiplication and a butterfly operation of the one or more data samples; (d) writing the one or more data samples from the computation unit back in place to the register array; and (e) writing the data words from the register array into the data memory.

In another embodiment, the first radix stage and the second radix stage are selected at least one of (i) radix-2, (ii) radix-3, (iii) radix-4, or (iv) radix-5 configurations, wherein the butterfly operations are completed for each radix stage of said FFT.

In yet another, embodiment, the method further includes the following steps: (a) fetching selected the data words from the data memory to one or more register arrays; (b) extracting the butterfly data samples from a butterfly extraction unit, wherein butterfly computations are performed in the computation unit; (c) storing computed results in the register array using the butterfly extraction unit; and (d) writing the computed results from the register array back to the data memory.

In yet another embodiment, the (i) fetching selected the data words from the data memory to one or more register arrays, (ii) extracting the butterfly data samples from the butterfly extraction unit, wherein butterfly computations are performed in the computation unit, (iii) storing computed results in the register array using the butterfly extraction unit, and (iv) writing the computed results from the register array back to the data memory, are performed in parallel.

In yet another embodiment, the method further includes the following step: repeating the steps of (i) the giving the one or more data samples from the register array to the computation unit, (ii) the performing a butterfly operation of the one or more input data samples, and (iii) the writing data samples from the computation unit back in place to the register array for other butterfly operations.

In yet another embodiment, the method further include the following step: repeating the step of (i) the fetching a one or more data words from the data memory into a register array based on a current radix and the determined radix configuration, (ii) the giving the one or more of data samples from the register array to the computation unit, (iii) the performing a butterfly operation of the one or more input data samples, and (iv) writing data samples from the computation unit back in place to the register array for a remaining data set in the current radix stage.

In yet another embodiment, the method further includes the following step: looping the steps of (i) the grouping of all current stage butterfly data samples in to a butterfly set and a set of associated data words, (ii) the fetching a one or more of data words from the data memory into a register array based on a current radix and the determined radix configuration, (iii) the giving the one or more of data samples from the register array to the computation unit, (iv) the performing a butterfly operation of the one or more input data samples, and (v) the writing data samples from the computation unit back in place to the register array till the end of all radix stages.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
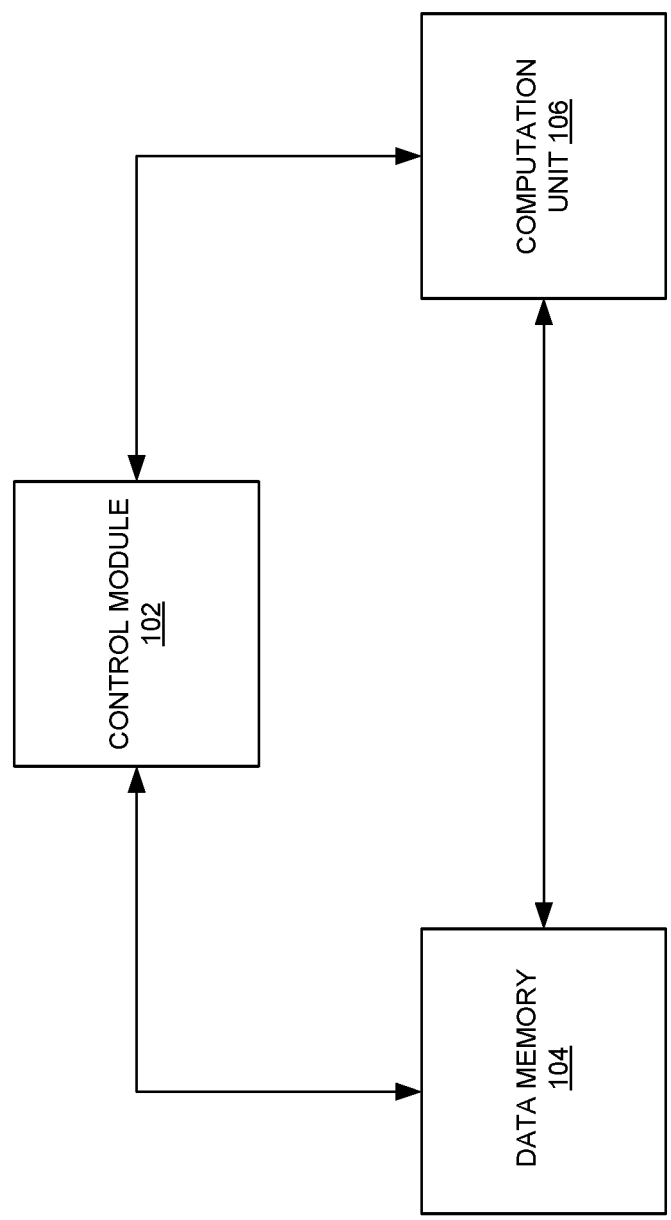
FIG. 1 illustrates a typical system level line diagram of a mixed-radix FFT solution according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the method and system disclosed herein provide a highly efficient scheme for computation of mixed-radix FFT that supports a wide range of FFT sizes and radix configuration. The scheme illustrated supports both FFT and IFFT without any internal change in scheme. The scheme illustrated here performs Decimation in time (DIT)-FFT computation, in which the input is provided in digit reversed (DR) order and output received in normal order. The embodiment can also support Decimation in Frequency (DIF)-FFT computation, without any internal changes in data processing. The system disclosed herein includes a data memory that is realized using single-port, single-memory bank and a register array, which acts as cache between memory and computational unit. Implementation of FFT is configured to support in-place mixed-radix FFT computation providing a high-throughput while consuming fewer resources. Referring now to the drawings, and more particularly to FIGS. 2 through 11, where similar reference characters denote corresponding features consistently throughout the figures, there are shown preferred embodiments.

Figure 2:
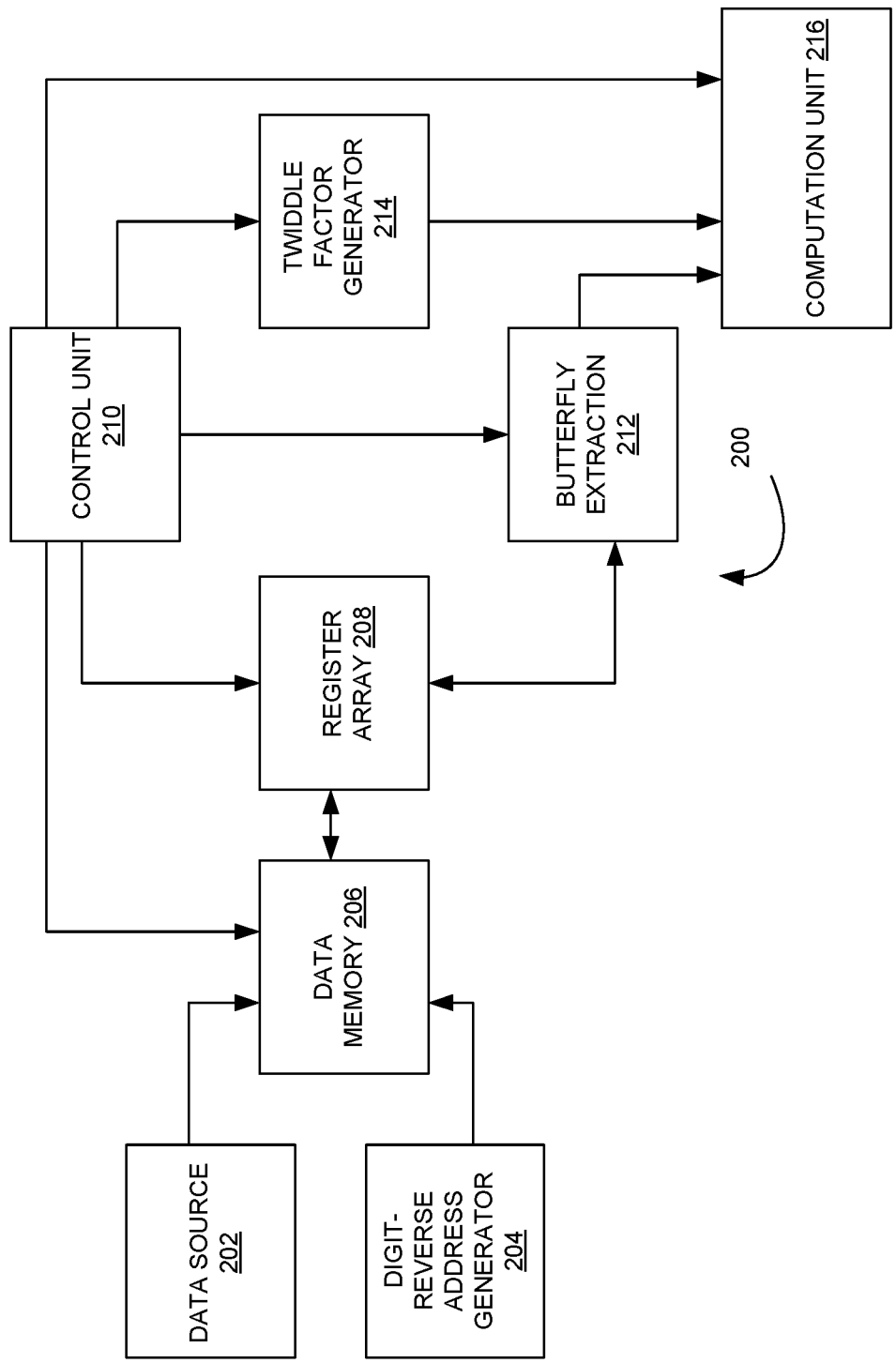
FIG. 2 illustrates a system level line diagram of optimizing a mixed-radix FFT and (I) FFT according to an embodiment herein.

FIG. 2 illustrates a system 200 for implementing a mixed-radix FFT, according to an embodiment. In an embodiment, the system 200 includes a data source 202, a digit-reverse address generator 204, a data memory 206, a register array 208, a control unit 210, a butterfly extraction unit 212, a twiddle factor generator 214, and a computation unit 216. The data source 202 provides an input data. In an embodiment, the digit-reverse address generator 204 generates a digit-reverse index for a given radix configuration, and given size of FFT. The data memory 206 holds the input data in digit-reversed order in case of DIT-FFT before beginning the operation of the computation unit 216. The data memory 206 also holds all the intermediate FFT stage outputs and a final output of the FFT, which is in normal order for DIT-FFT. In case of DIF-FFT, the data memory 206 initially holds input data in normal order, and then stores intermediate stage outputs and final output, which is in digit-reverse (DR) order. The data memory 206 stores multiple data samples in a single address. Multiple data samples stored at a single memory location is called "data word". For N-sized FFT, if 6 samples are packed in one memory location, then the total number of data words is N/6. In an embodiment, FFT stage is defined by the value of radix for which butterfly operations are performed. For example, consider 12 point FFT operations and decomposing the 12 point FFT into radix-3 and radix-4. The radix-3 is first stage and the radix-4 is the second stage. The register array 208 is a small set of registers that holds input data before feeding into the computation unit 216, and holds output of the computation unit 216 before being written into single port single bank memory. It acts like a cache between the data memory 206 and the computational unit 216, thus keeping computational unit busy.

The butterfly extraction unit 212 extracts samples for butterfly operation from the register array 208, based on a current radix and a radix configuration (sequential position of the radix stage). The radix configuration indicates for example, ordering of radix, such as value of a first stage radix, a second stage radix and so on till the last stage radix. The twiddle factor generator 214 generates twiddle factors. Parallel twiddle factor generation can be done using look-up table (LUT) and/or memory and/or generated on-the-fly (using sine/cosine series implementation). The twiddle factor generator 214 outputs the correct twiddle factor, based on current radix and radix configuration. The computation unit 216 performs twiddle factor multiplication and butterfly operation. The output from the computation unit 216 is written back to the register array 208. The control unit 210 schedules operations for reading/writing the register array 208, the butterfly extraction unit 212, and the twiddle factor generator 214 and the computation unit 216. Based on number of butterfly operations supported in parallel, the constraint on the twiddle factor generator 214 is fixed. For Example: If computational unit supports 2 radix-2, 1 radix-3, 1 radix-4, 1 radix-5, then maximum number of twiddle factors required is 4 for radix-5. To support parallel twiddle factor generation, multiple LUT banks are used, which can provide twiddle factors in parallel. The size and number of entries in LUT depends on arrange of sizes of FFT supported.

The digit-reverse address generator 204 generates digit reversed address for given any radix configuration. In an embodiment, the generation of the digit reverse address is done once before starting IFFT/FFT operation. The address generated is used to store input in DIT mode or read final output in DIF mode from the data memory 206. The digit reverse address calculation is done by calculating weights for each radix stage and then a counter is used to count till size of FFT. For Example, consider a radix configuration where N=24=[2 3 4], R=[2 3 4] is the radix configuration, where radix-2 is the first stage, radix-3 is the second stage, radix-4 is the third stage. $W_r$=[1 2 4 1], is the weight vector of radix configuration, used for digit-reverse operation, $W_r$ for radix-2 position is calculated by product of radices to the right of radix-2 such as radix-3 and radix-4, then $W_r$ for radix-3 position is calculated by product of radix to the right of radix-3 that is radix-4. $W_r$ for radix-4 position is 1 since it is the last radix. Given any index in R=[2 3 4] radix configuration, the digit-reversed index is calculated as follows:

Input:—index_val=10=[2 0 1], the digit-reversed index is given by:
Output:—digit_reversed_val=1*12+0*4+2*1=14.
The $10^{th}$ data is stored in $14^{th}$ address position in the data memory 206.

Multiple data words from data the memory 206 are read, and cached in the register array 208. The number of samples to pack in data word on memory depends on the radix configuration and throughput required. In an embodiment, the LTE system uses 6 samples per address. The register array 208 includes a small set of registers, which can hold multiple data words. Due to presence of the register array 208, the process of fetching input data from memory and supplying input data from the register array 208 to computational unit can be overlapped. This is done by using multiple the register arrays 208. Also, schedule of fetching and storing data from memory to the register array 208 is performed, so as to get ~100% utilization of memory bandwidth. Data exchange between the data memory 206 and the register array 208 takes place at data word level, while data exchange between register array 208 and computational unit 216 happens at butterfly specific samples.

In an embodiment, the data samples access pattern from the register array 208 to computational unit depends on radix and radix configuration. For DIT-FFT/DIF-FFT, the difference is 1 for first stage butterfly operations. For the second stage, the difference is dependent on value of first stage radix. For the third stage, the difference is now product of radices of first two stages. The access patterns from the register array 208 may be reduced by applying some rules on radix configuration. In case of LTE, if the product of first two stages is made to be multiple of 6, then all access patterns for the third stage onwards is same, i.e. difference will always be 6 in the register array 208. For example, 12=3×4 is decomposed as radix-3 followed by radix-4. The order of radix decomposition is performed, so that the first two radices are multiple of 6. Six data samples are packed in one word in the data memory 206. The digit reverse of indices is performed without using any multipliers for LTE. The first stage access pattern difference is 1, while for second stage the difference is 3. By reducing the number of access patterns in the register array 208 access, the multiplexing logic is simplified.

In an embodiment, the computational unit 216 is pipelined, and supports multiple radix butterfly computations. For LTE, the computational unit 216 can support radix-2, 3, 4, and 5. The computational unit 216 consists of multipliers and adders shared to reduce the area.

The parallel twiddle factor generation is done to support parallel twiddle factor multiplication. The twiddle factor generation is performed by using LUT storage. LUT storage may be optimized by using least common multiple (LCM) of all possible multiples of twiddle factor sizes required for every stage of each FFT size. For example, for N=24=[2 3 4], the possible twiddle factor sizes are:[2 6 2 4]. Based on the radix configuration of all FFT sizes, the total number of list of twiddle factor sizes is derived. The LCM of this list is used for optimizing storage. Furthermore, LUT storage is optimized by storing only one quadrant of sine-cosine information. For LTE, by using radix configuration, where first two stages are multiple of 6, the number of unique LUT entries can be reduced to 9 unique LUTs. The 9 unique values are: 648, 720, 768, 864, 900, 960, 972, 1080, 1152 and 1200. The total number of entries considering only 9 LUTs is 2316 and extra 184 entries in case of bank clashes in LUT access. Totally 2500 entries are required to support all 34 unique LTE FFT sizes.

In an embodiment, a pseudo-code explains how the system architecture actually performs computation. Following is the pseudo-code of mixed-radix FFT mapping of loops to the data memory 206, the register arrays 208 and control to different blocks of FIG. 2 is detailed by using the pseudo code. The steps of the pseudo-code are (i) Generate digit-reverse index for a given FFT size (N) and corresponding radix configuration (R). The input data (which is stored in normal order) is re-arranged according to digit reversed index and this is the input to FFT algorithm and (ii) The twiddle factors for each stage, given FFT size (N) and radix configuration (R) are generated and stored in 'W' matrix.

The computation is done using two loop structures. A first loop runs at granularity of stage, and a second loop runs at a level of butterfly computation. The digit reversed data is read and multiplied with twiddle factor array based on stage index. Then, according to the radix of that stage, radix-2/3/4/5 butterfly operation is performed. The butterfly operation is done by performing multiplication with DFT matrix 'W_mtx', which is generated once every stage. The output is stored back in the same vector as the input vector, thus in-place computation is done.

For example, Pseudo-Code for Mixed-radix FFT of size N

```
// STEP 1 -- Generate digit-reverse indices for N-sized FFT given radix configuration
RDX_ARRAY = [N₁ N₂ N₃ ... N_NUM_STAGE]
// N₁ - first stage radix, N₂ - second stage radix,
// N_NUM_STAGE is the last stage radix
// where 'NUM_STAGE' is the number of stages of FFT
// N is written as the product of radix configuration
N = PRODUCT (RDX_ARRAY)              // product of all radix in RDX_ARRAY
  NUM_STAGE = LENGTH(RDX_ARRAY)      // number of stages in RDX_ARRAY
  // CALCULATE RDX_WEIGHT for digit-reverse operation
  //INITIALIZE RDX_WEIGTH TO ALL ONES
RDX_WEIGHT = [1 1 1 ... 1_NUM_STAGE]
  // Stage loop to calculate weight of each stage for digit-reverse operation
  FOR STAGE_IDX = 1 : NUM_STAGE
  IF(STAGE_IDX == NUM_STAGE)
  //last stage weight is fixed at 1
      RDX_WEIGHT(STAGE_IDX) = 1
    ELSE
      // Calculate Product from (STAGE_IDX + 1) to last stage (NUM_STAGE)
      RDX_WEIGHT (STAGE_IDX) = PRODUCT (RDX_ARRAY(STAGE_IDX+1 : NUM_STAGE))
    END
  END // end of stage index loop
```

```
// Calculate digit-reverse index
// Initialize digit-reverse index array to all zeros
DIG_REV_IDX = ZEROS(N, 1)
//Initialize Sample Index representation in terms of individual radix
RDX_SAMPLE_IDX = ZEROS(1,NUM_STAGE)
// stage loop
FOR SAMPLE_IDX = 0 : (N - 1)
    FOR STAGE_IDX = 1 : NUM_STAGE
        DIG_REV_IDX(SAMPLE_IDX) = DIG_REV_IDX(SAMPLE_IDX) + RDX_SAMPLE_IDX(STAGE_IDX) *
                RDX_WEIGHT(STAGE_IDX)
    END // end of FOR loop -- STAGE_IDX
    // Increment RDX_SAMPLE_IDX array, this increments considering the radix configuration
    RDX_SAMPLE_IDX = INCREMENT_BY_1(RDX_SAMPLE_IDX)
END // end of FOR loop  -- SAMPLE_IDX
    // STEP 2 - Copy data in normal order into digit-reverse index locations
    // INP_DATA - array contains data in normal order
    // X_MEM -- array contains data in digit-reverse order
FOR SAMPLE_IDX = 0 : (N-1)
    X_MEM(DIG_REV_IDX(SAMPLE_IDX)) = INP_DATA(SAMPLE_IDX)
END
    // STEP 3 - Perform FFT Operation
    // Number of samples per word
NUM_SAMPLES_PER_WORD = 6
    // stage loop
FOR STAGE_IDX = 1 : NUM_STAGE
        CURR_RDX           = RDX_ARRAY (STAGE_IDX)
        PROD_TILL_CURR_RDX = PRODUCT (RDX_ARRAY (1 : STAGE_IDX))
        BUTFLY_OFFSET      = (PROD_TILL_CURR_RDX/CURR_RDX)
        BUTFLY_OFFSET_IDX  = BUTFLY_OFFSET/NUM_SAMPLES_PER_WORD
        ADDR_OFFSET   =FLOOR(PROD_TILL_CURR_RDX/NUM_SAMPLES_PER_WORD)
IF(STAGE_IDX == 1)
        PREV_TWD_SIZE   = 1      // Previous Twiddle factor value
        FIRST_STAGE     = 1      // Flag for indicating first stage
    ELSE
        PREV_TWD_SIZE = TWD_SIZE
        FIRST_STAGE     = 0
    END
// Current value of Twiddle factor
        TWD_SIZE            = PROD_TILL_CURR_RDX
        READ_BASE_ADDR      = 1
        READ_OFFSET         = ADDR_OFFSET
        READ_JUMP           = 0
        READ_LINE_COUNT     = 0
        READ_JUMP_COUNT     = 0
        WRITE_BASE_ADDR     = 1
        WRITE_OFFSET        = ADDR_OFFSET
        WRITE_JUMP          = 0
        WRITE_LINE_COUNT    = 0
        WRITE_JUMP_COUNT    = 0
        // Butterfly matrix of size CURR_RDX - GET_DFTMTX function
        // for radix-2, RDX_MTX = [1 1; 1 -1]
        // for radix-3, RDX_MTX = [1 1 1; 1 -0.5-0.866j -0.5+0.866j; 1 -0.5+0.866j -0.5-0.866j]
        // for radix-4, RDX_MTX = [1 1 1 1; 1 -j -1 j; 1 -1 1 -1; 1 j -1 -j]
        // for radix-5, RDX_MTX = [1 1 1 1 1; 1 0.3-0.95j -0.8-0.58j -0.8+0.58j 0.3+0.95j;
        //                        1 -0.8-0.58j 0.3+0.95j 0.3-0.95j -0.8+0.58j
        //                        1 -0.8+0.58j 0.3-0.95j 0.3+0.95j -0.8-0.58j
        //                        1 0.3+0.95j -0.8+0.58j -0.8-0.58j 0.3-0.95j]
        RDX_MTX         = GET_DFTMTX (CURR_RDX) // Function Call
        // Number of Butterflies per stage
FOR NUM_BFLY_PER_STAGE = 1 : NUM_SAMPLES_PER_WORD : (N/CURR_RDX)
            // Initialize Memory address to fetch data from Memory to Local Cache
        READ_MEM_IDX = READ_BASE_ADDR + READ_OFFSET + READ_JUMP
            // Data Memory to Cache
FOR NUM_MEM_READ = 1 : CURR_RDX
IF(NUM_MEM_READ == 1)
            CACHE_IDX = 1 : 1 : NUM_SAMPLES_PER_WORD
        ELSE
            CACHE_IDX = CACHE_IDX + NUM_SAMPLES_PER_WORD
        END
        // Store in Register Array (X_CACHE)
        X_CACHE (CACHE_IDX) = X_MEM (READ_MEM_IDX)
IF((READ_LINE_COUNT == CURR_RDX) && !(ADDR_OFFSET == 1))
        READ_OFFSET = 0
IF((READ_JUMP_COUNT + 1) == ADDR_OFFSET)
            READ_BASE_ADDR = 0
        ELSE
            READ_BASE_ADDR = READ_BASE_ADDR + 1
        END
```

```
IF((READ_JUMP_COUNT + 1) == ADDR_OFFSET)
READ_JUMP_VAL = READ_JUMP_VAL + (PREV_TWD_SIZE/2) + ADDR_OFFSET
            END
         ELSE
            READ_OFFSET = READ_OFFSET + ADDR_OFFSET
         END
IF((READ_LINE_COUNT > CURR_RDX) || (ADDR_OFFSET == 1))
            READ_LINE_COUNT = 0
         ELSE
            READ_LINE_COUNT = READ_LINE_COUNT + 1
         END
IF((READ_LINE_COUNT > CURR_RDX) && !(ADDR_OFFSET == 1))
IF((READ_JUMP_COUNT + 1) == ADDR_OFFSET)
            READ_JUMP_COUNT = 0
         ELSE
            READ_JUMP_COUNT = READ_JUMP_COUNT + 1
         END
      END
END // End of Data Fetch from Data Memory to Cache
      // Cache to Computational unit
FOR NUM_BFLY = 1 : NUM_SAMPLES_PER_WORD
IF(NUM_BFLY == 1)
         CACHE_IDX = ONES(1,CURR_RDX)
         TWD_IDX = ZEROS(1,CURR_RDX)
IF(FIRST_STAGE)
            CACHE_IDX = CACHE_IDX
            TWD_IDX = TWD_IDX
         ELSE
            FOR INIT_IDX = 1 : CURR_RDX
IF(INIT_IDX == 1)
               CACHE_IDX(INIT_IDX) = 1
               TWD_IDX(INIT_IDX) = 0
            ELSE
CACHE_IDX(INIT_IDX) = CACHE_IDX(INIT_IDX-1) + (ADDR_OFFSET == 1) ? PREV_TWD_SIZE :
NUM_SAMPLES_PER_WORD)
               TWD_IDX(INIT_IDX) = TWD_IDX(INIT_IDX-1) + TWD_SIZE
            END
         END
      ELSE
// Array Addition
CACHE_IDX = CACHE_IDX + 1
         TWD_IDX = TWD_IDX + 1
      END
      // Multiply with Twiddle Factor
      // TWD_FROM_LUT is look up table realization of twiddle factor
      // generation
X_AFTER_TWID_MUL = TWD_FROM_LUT (TWD_IDX) * X_CACHE_IN (CACHE_IDX)
      // Perform Butterfly Operation, RDX_MTX is matrix
X_AFTER_BUTFLY_OPERATION = RDX_MTX * X_AFTER_TWID_MUL
      // write output to Register Array
X_CAHCE_OUT(CACHE_IDX) = X_AFTER_BUTFLY_OPERATION
END // end of computation loop
      // Cache to Data Memory
FOR NUM_MEM_WRITE = 1 : CURR_RDX
// Initialize Memory address to fetch data from Memory to Local Cache
WRITE_MEM_IDX = WRITE_BASE_ADDR + WRITE_OFFSET + WRITE_JUMP
IF(NUM_MEM_WRITE == 1)
         CACHE_IDX = 1 : 1 : NUM_SAMPLES_PER_WORD
      ELSE
         CACHE_IDX = CACHE_IDX + NUM_SAMPLES_PER_WORD
      END
      // Write data from Cache to Memory
X_MEM (WRITE_MEM_IDX) = X_CACHE (CACHE_IDX)
IF((WRITE_LINE_COUNT == CURR_RDX) && !(ADDR_OFFSET == 1))
         WRITE_OFFSET = 0
IF((WRITE_JUMP_COUNT + 1) == ADDR_OFFSET)
            WRITE_BASE_ADDR = 0
         ELSE
            WRITE_BASE_ADDR = WRITE_BASE_ADDR + 1
         END
IF((WRITE_JUMP_COUNT + 1) == ADDR_OFFSET)
WRITE_JUMP_VAL = WRITE_JUMP_VAL + (PREV_TWD_SIZE/2) + ADDR_OFFSET
            END
         ELSE
            WRITE_OFFSET = WRITE_OFFSET + ADDR_OFFSET
         END
```

```
IF((WRITE_LINE_COUNT > CURR_RDX) || (ADDR_OFFSET == 1))
        WRITE_LINE_COUNT = 0
     ELSE
        WRITE_LINE_COUNT = WRITE_LINE_COUNT + 1
     END
IF((WRITE_LINE_COUNT > CURR_RDX) && !(ADDR_OFFSET == 1))
IF((WRITE_JUMP_COUNT + 1) == ADDR_OFFSET)
           WRITE_JUMP_COUNT = 0
        ELSE
           WRITE_JUMP_COUNT = WRITE_JUMP_COUNT + 1
        END
     END
END // End of Data Store from Cache to Data Memory
END // end of butterfly loop
END   // end of stage loop
```

The data storage in the data memory 206, the register array 208 access pattern is explained for the case of LTE realization using the scheme proposed. Radix configuration is performed, so as to start from lowest valued radix in the first stage and multiplication of first two radices must yield a multiple of 6. The computational unit 216 supports 2 radix-2, 1 radix-3, 1 radix-4 and 1 radix-5 butterfly operations every cycle. The number of the register arrays 208 used is 3, and number of data words in each register arrays is 5. Each data word contains 6 data samples.

Figure 3:
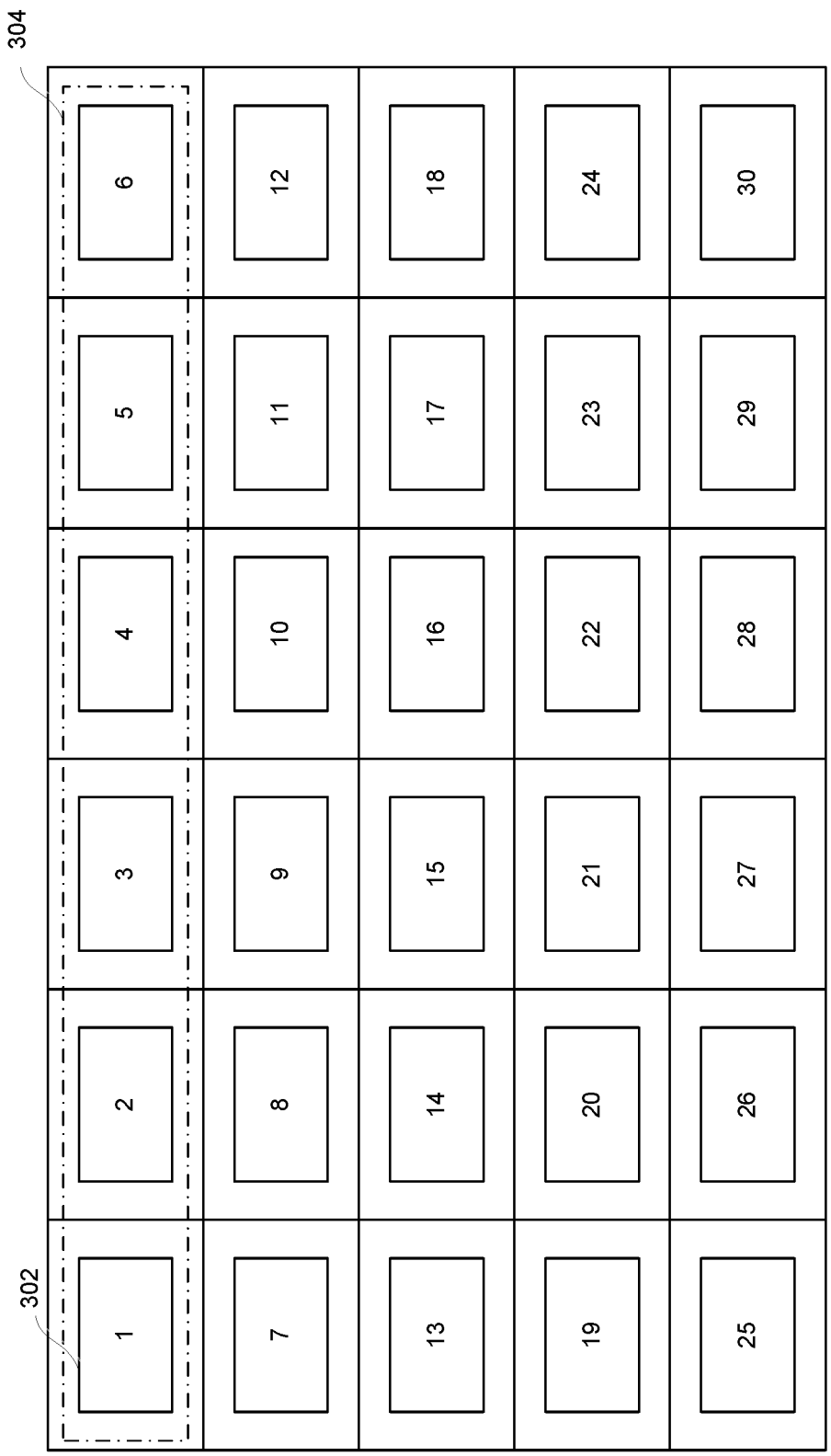
FIG. 3 illustrates a block of a data memory of multiple data samples packed into single address according to an embodiment herein.

FIG. 3 illustrates a block of the data memory 206 of multiple data samples packed into single address according to an embodiment herein. The data samples 302 packed into single address are shown in a side doted box 304. A data word is shown in the side doted box 304.

Figure 4:
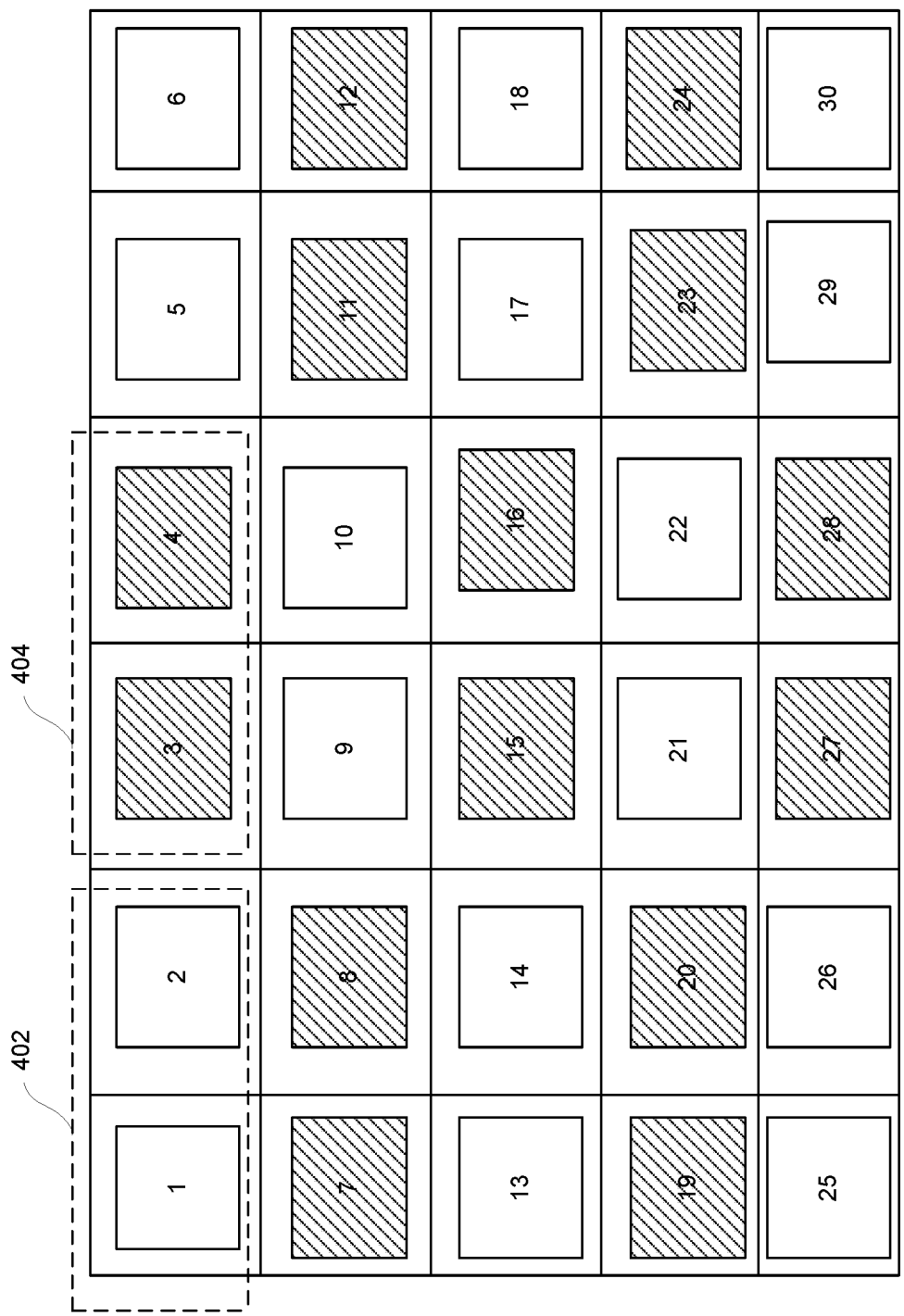
FIG. 4 illustrates a snapshot of a register array during radix-2 butterfly operation, a data sample is accessed with an index difference of 1 according to an embodiment herein.

FIG. 4 illustrates a snapshot of a register array 208 during radix-2 butterfly operation, a data sample is accessed with an index difference of 1 according to an embodiment herein. A least radix is the first stage, always this is the access pattern for radix-2. A sample of same category at the index difference of 1 is given as an input to the computation unit 216. The computational unit 216 can support 2 radix-2 operations, a first category of samples 402 represented within a dashed rectangular box including a square box, and a second category of samples 404 represented within a dashed rectangular box including a square box enclosed in a pattern of a cross parallel lines are given simultaneously to computational unit 216. In the next butterfly, the next 4 consecutive data samples are given to the computational unit 216.

Figure 5:
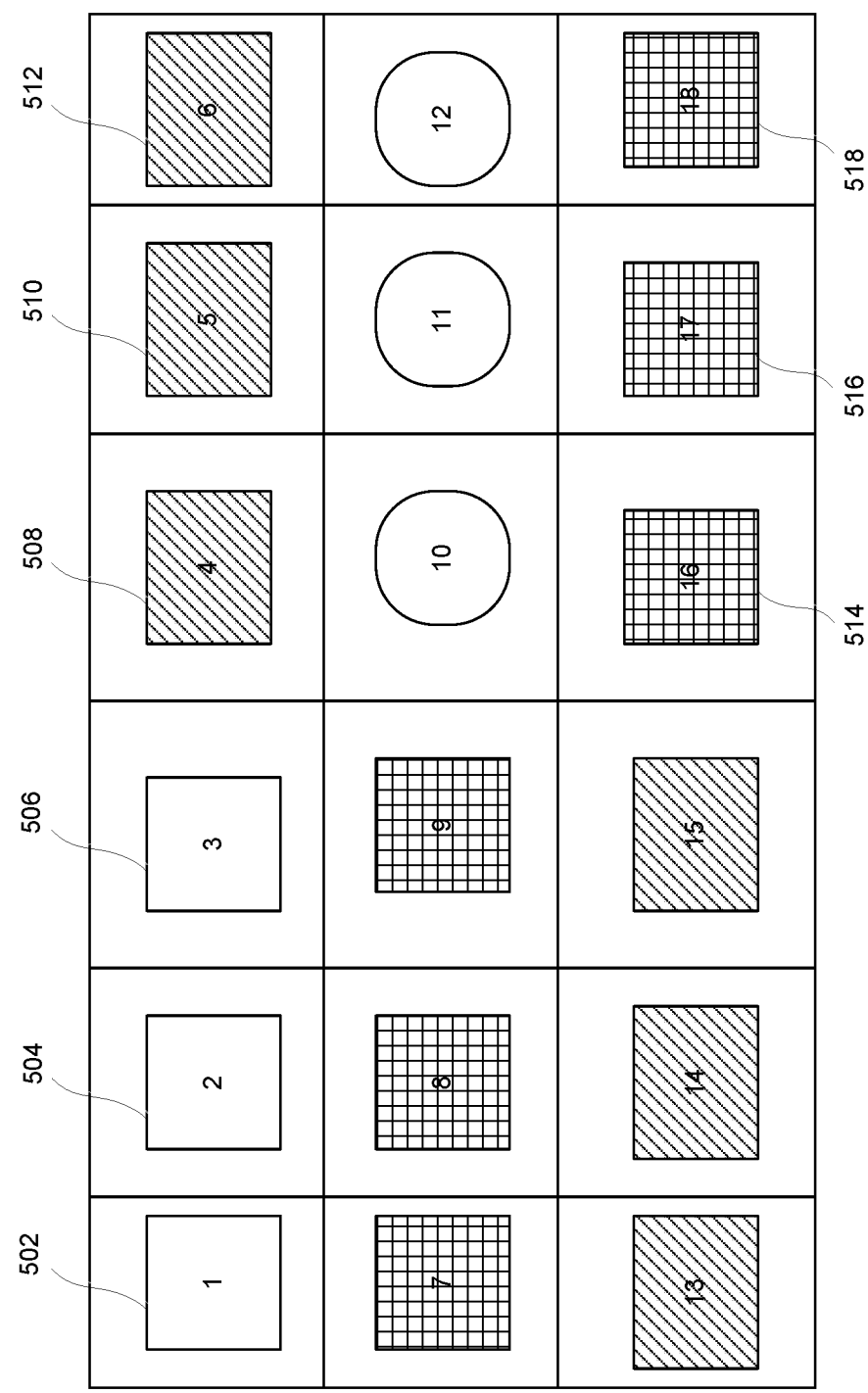
FIG. 5 illustrates a radix-3 access pattern in the register array, with samples accessed at index difference of 1. 3 consecutive samples with index difference of 1 given as one set of input to the computation unit 216 according to an embodiment herein.

FIG. 5 illustrates a radix-3 access pattern in the register array 208, with samples accessed at index difference of 1. 3 consecutive samples with index difference of 1 given as one set of input to the computation unit 216 according to an embodiment herein. In an embodiment, a first category of samples (502, 504, 506) represented within a square box are provided first in parallel, then a second category of samples (508, 510, 512) represented within a square box enclosed in a pattern of a cross parallel lines is provided, and so on till all samples in the register array 208 are consumed by the computational unit 216.

Figure 6:
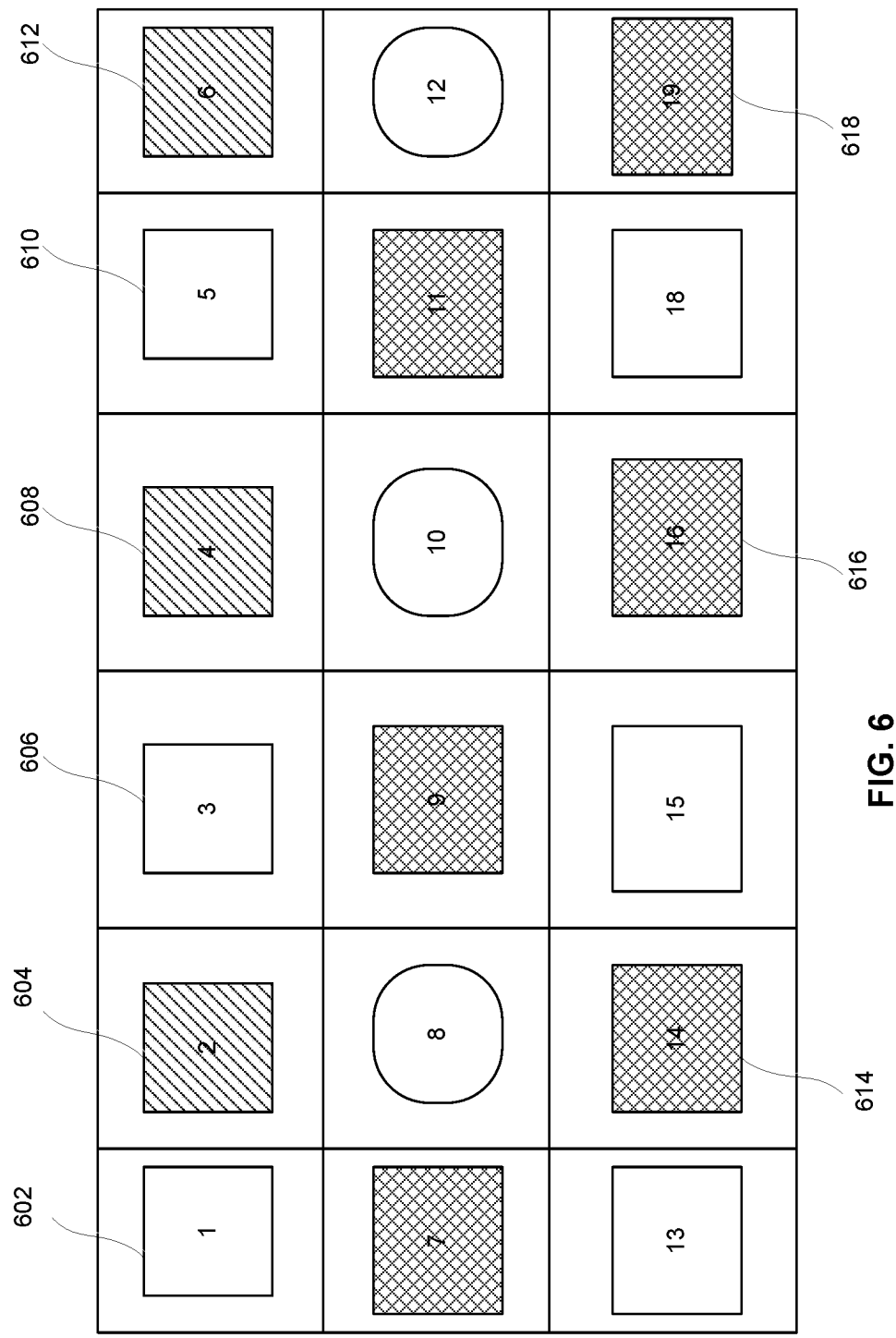
FIG. 6 illustrates a snapshot of the register array during radix-3 butterfly operation with an index difference of 2. 3 samples of same category with index difference of 2 given as one set of input to a computation unit according to an embodiment herein.
Figure 7:
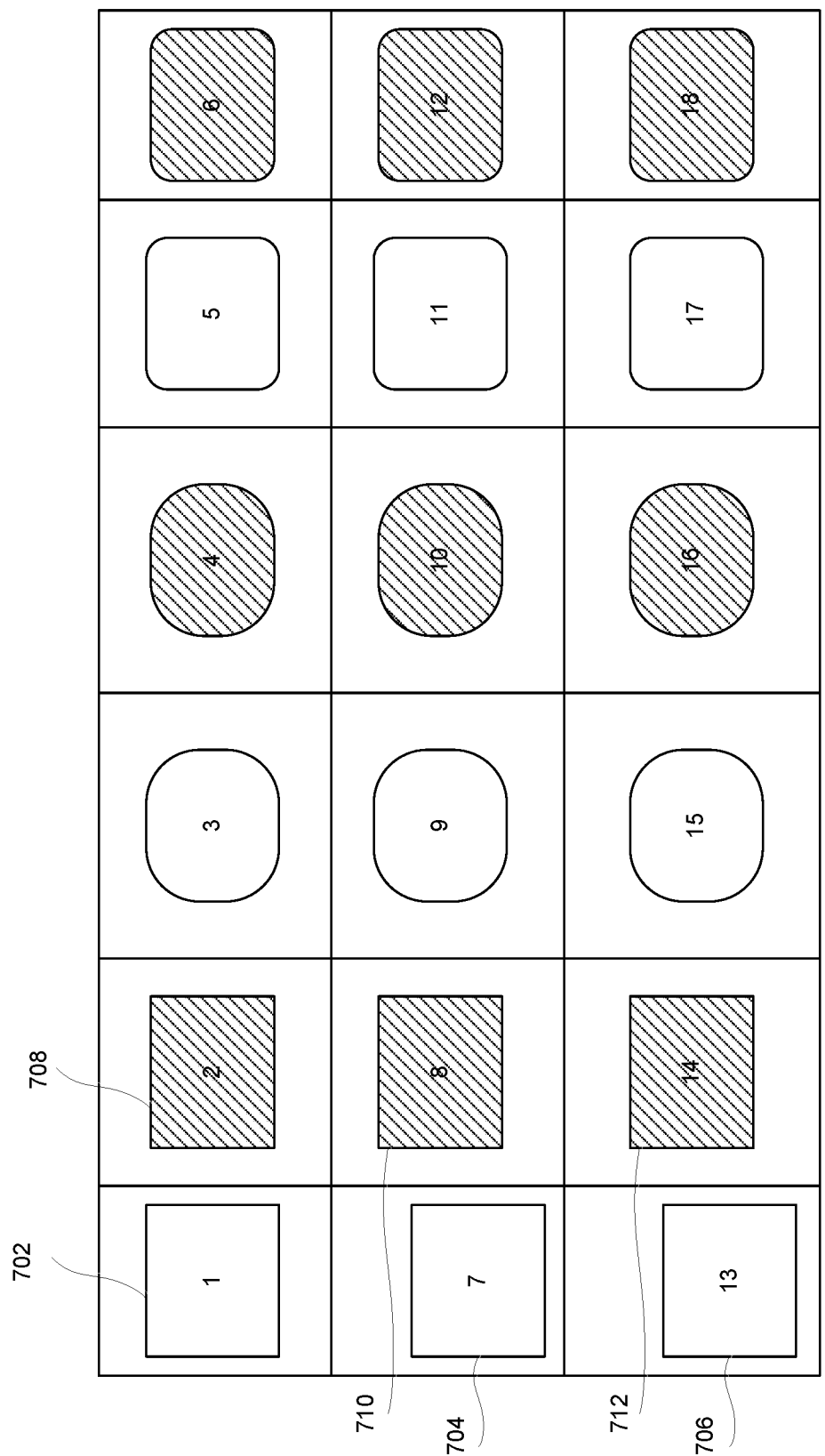
FIG. 7 illustrates a snapshot of the register array during radix-3 butterfly operation with an index difference of 6 or multiple of 6. 3 samples of same category with index difference of 6 are given as one set of input to the computation unit according to an embodiment herein.

FIG. 6 illustrates a snapshot of the register array 208 during radix-3 butterfly operation with an index difference of 2. 3 samples of same category with index difference of 2 given as one set of input to the computation unit 216 according to an embodiment herein. A first category of samples (602, 606, 610) represented within a square box is provided first, then a second category of samples (604, 608, 612) represented within a square box enclosed in a pattern of a cross parallel lines is provided, and then a third category of samples (614, 616, 618) represented within a square box enclosed in a pattern of a diamond shaped lines is provided. This case occurs when first stage is radix-2 and radix-3 is the second stage FIG. 7 illustrates a snapshot of the register 208 array during radix-3 butterfly operation with an index difference of 6 or multiple of 6. 3 samples of same category with index difference of 6 are given as one set of input to the computation unit 216 according to an embodiment herein. A first category of samples (702, 704, 706) represented within a square box are input first, and a second category of samples (708, 710, 712) represented within a square box enclosed in a pattern of a cross parallel lines are given the computation unit 216 and so on.

Figure 8:
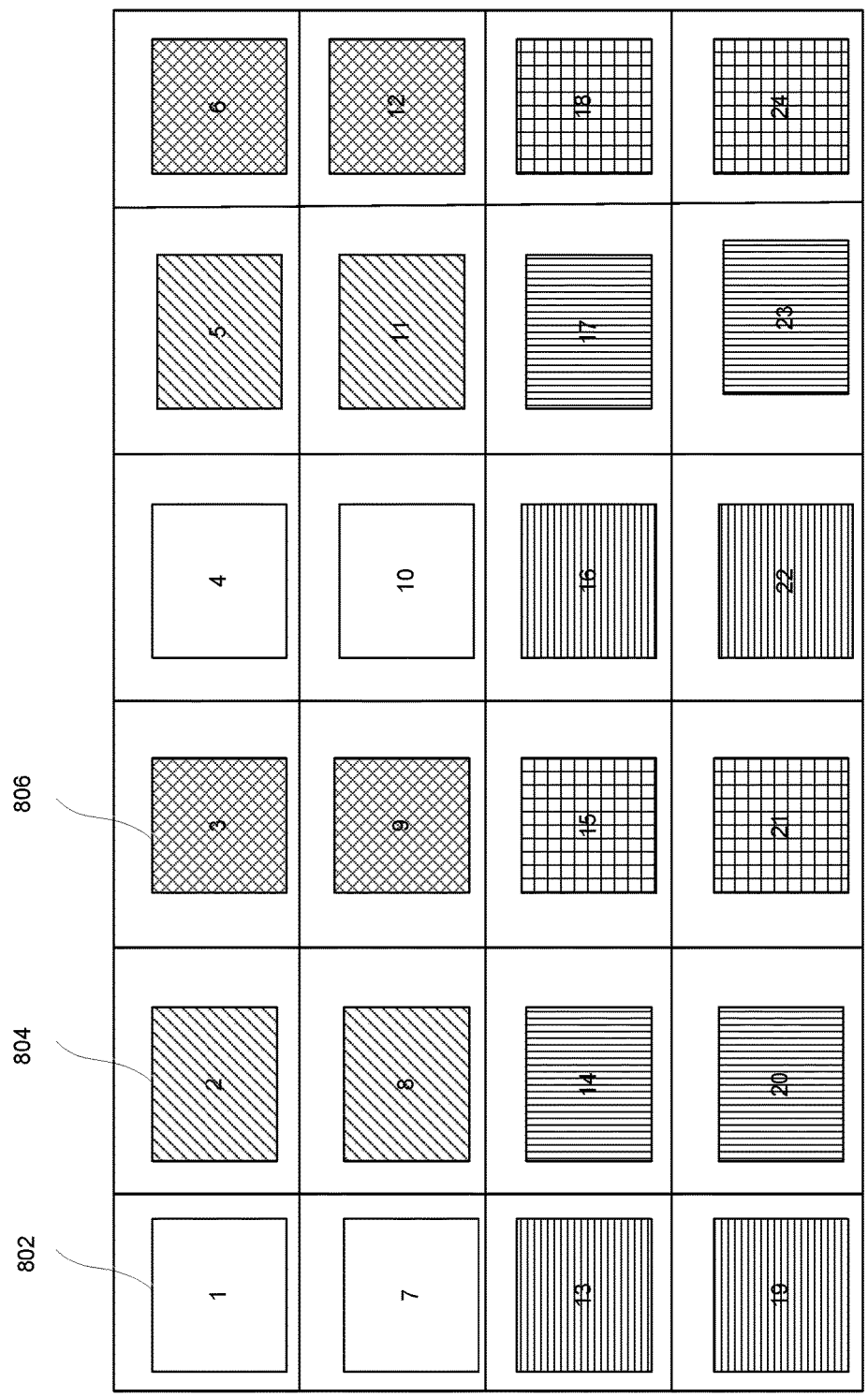
FIG. 8 illustrates a snapshot of the register array during radix-4 butterfly operation with an index difference of 3. 4 samples of same category with index difference of 3 are given as one set of input to the computation unit according to an embodiment herein.

FIG. 8 illustrates a snapshot of the register array 208 during radix-4 butterfly operation with an index difference of 3. 4 samples of same category with index difference of 3 are given as one set of input to the computation unit 216 according to an embodiment herein. A first category of samples 802 represented within a square box, a second category of samples 804 represented within a square box enclosed in a pattern of a cross parallel lines, and a third category of samples 806 represented within a square box enclosed in a pattern of a diamond shaped lines are input to the computation unit 216 and so on.

Figure 9:
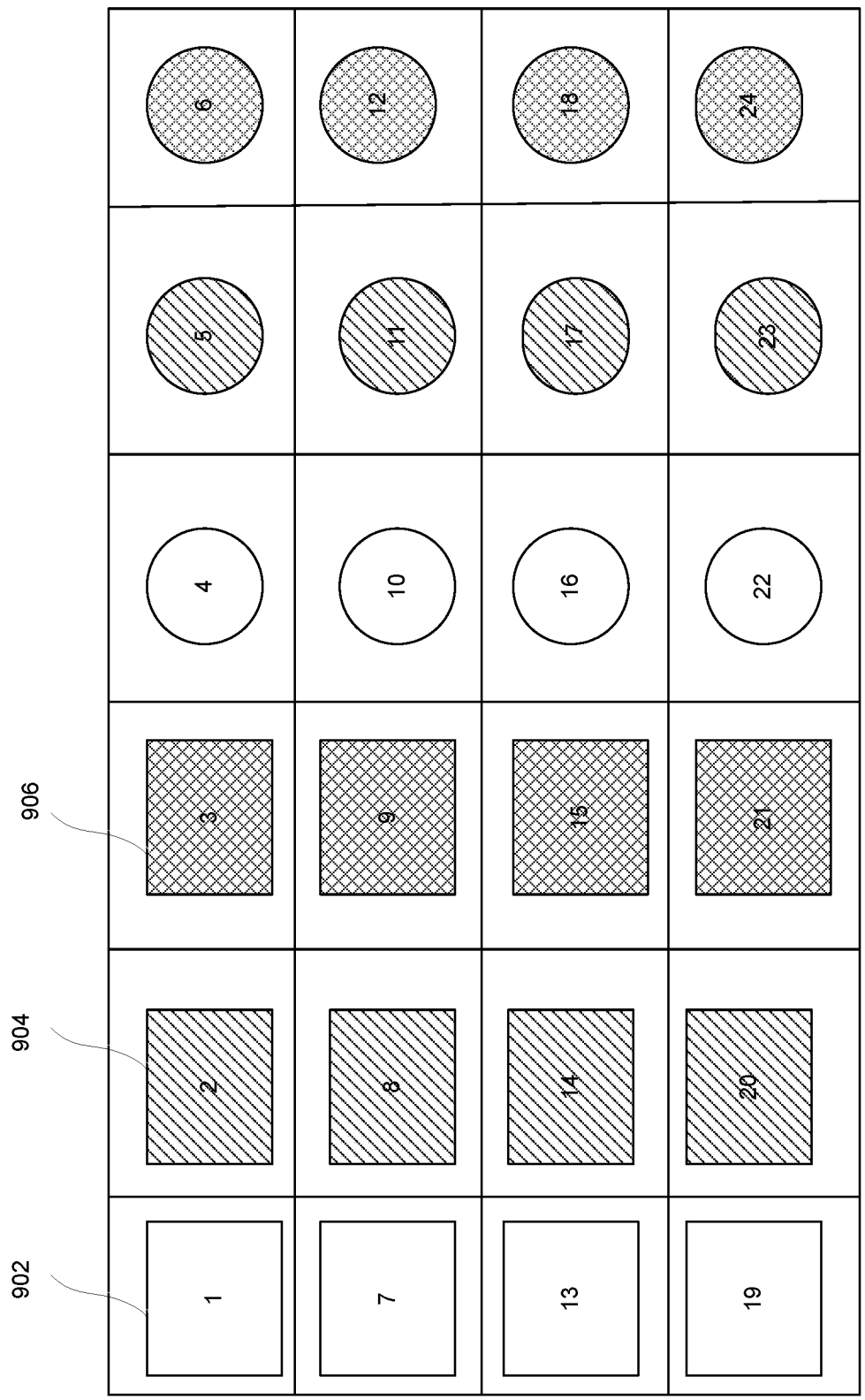
FIG. 9 illustrates a snapshot of the register array during radix-4 butterfly operation with an index difference of 6 or multiple of 6, 4 samples of same category with index difference of 6 given as one set of input to the computation unit according to an embodiment herein.

FIG. 9 illustrates a snapshot of the register array 208 during radix-4 butterfly operation with an index difference of 6 or multiple of 6, 4 samples of same category with index difference of 6 given as one set of input to the computation unit 216 according to an embodiment herein. A first category of samples 902 represented within a square box, a second category of samples 904 represented within a square box enclosed in a pattern of a cross parallel lines, and a third category of samples 906 represented within a square box enclosed in a pattern of a diamond shaped lines are input to the computation unit 216.

Figure 10:
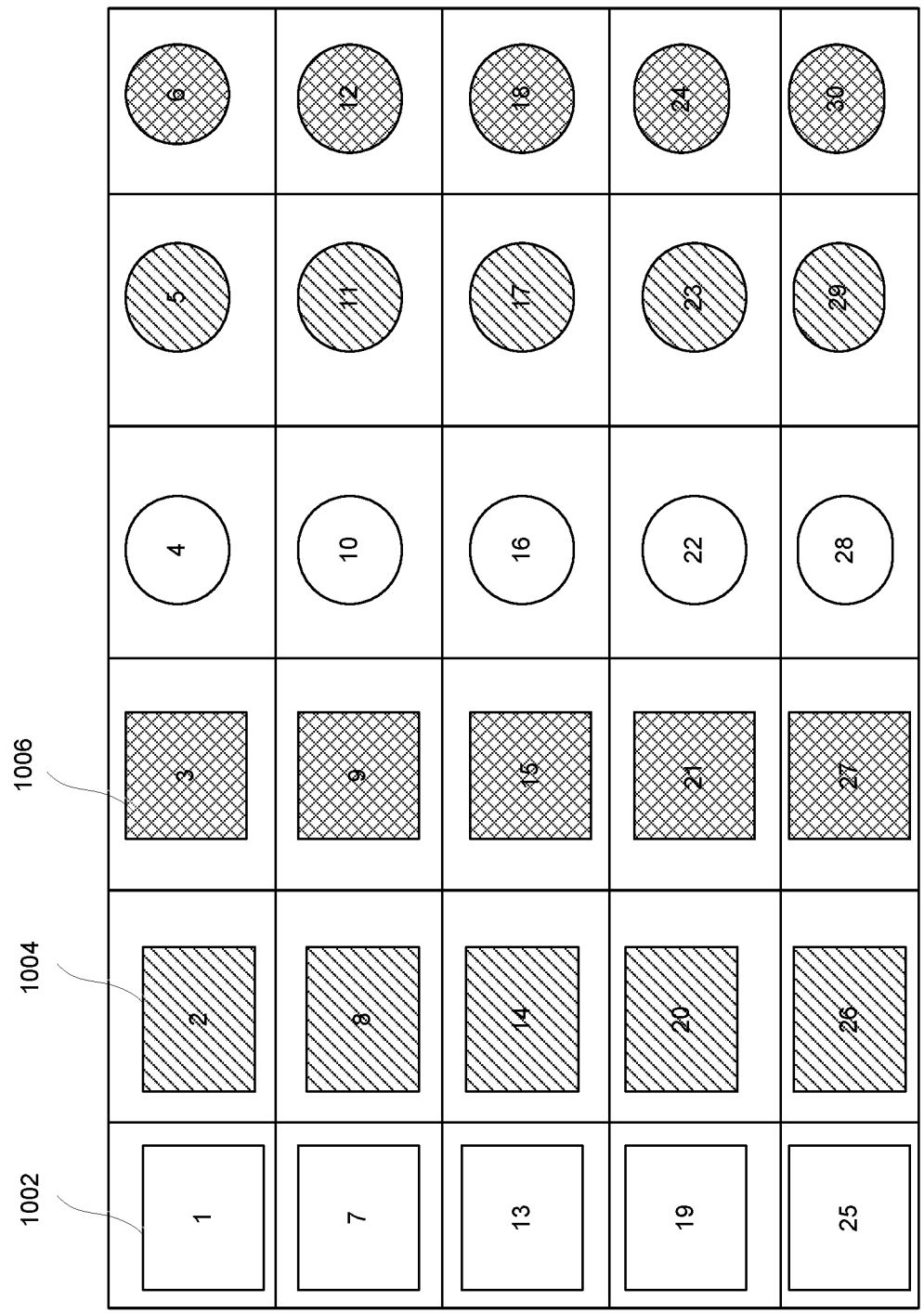
FIG. 10 illustrates a snapshot of the register array during radix-5 butterfly operation with an index difference of 6 or multiple of 6. 5 samples with index difference of 6 given as one set of input to the computation unit according to an embodiment herein.

FIG. 10 illustrates a snapshot of the register array 208 during radix-5 butterfly operation with an index difference of 6 or multiple of 6. 5 samples with index difference of 6 given as one set of input to computation unit 216 according to an embodiment herein. A first category of samples 1002 represented within a square box, a second category of samples 1004 represented within a square box enclosed in a pattern of a cross parallel lines, and a third category of samples 1006 represented within a square box enclosed in a pattern of a diamond shaped lines are input to the computation unit 216 and so on.

Figure 11:
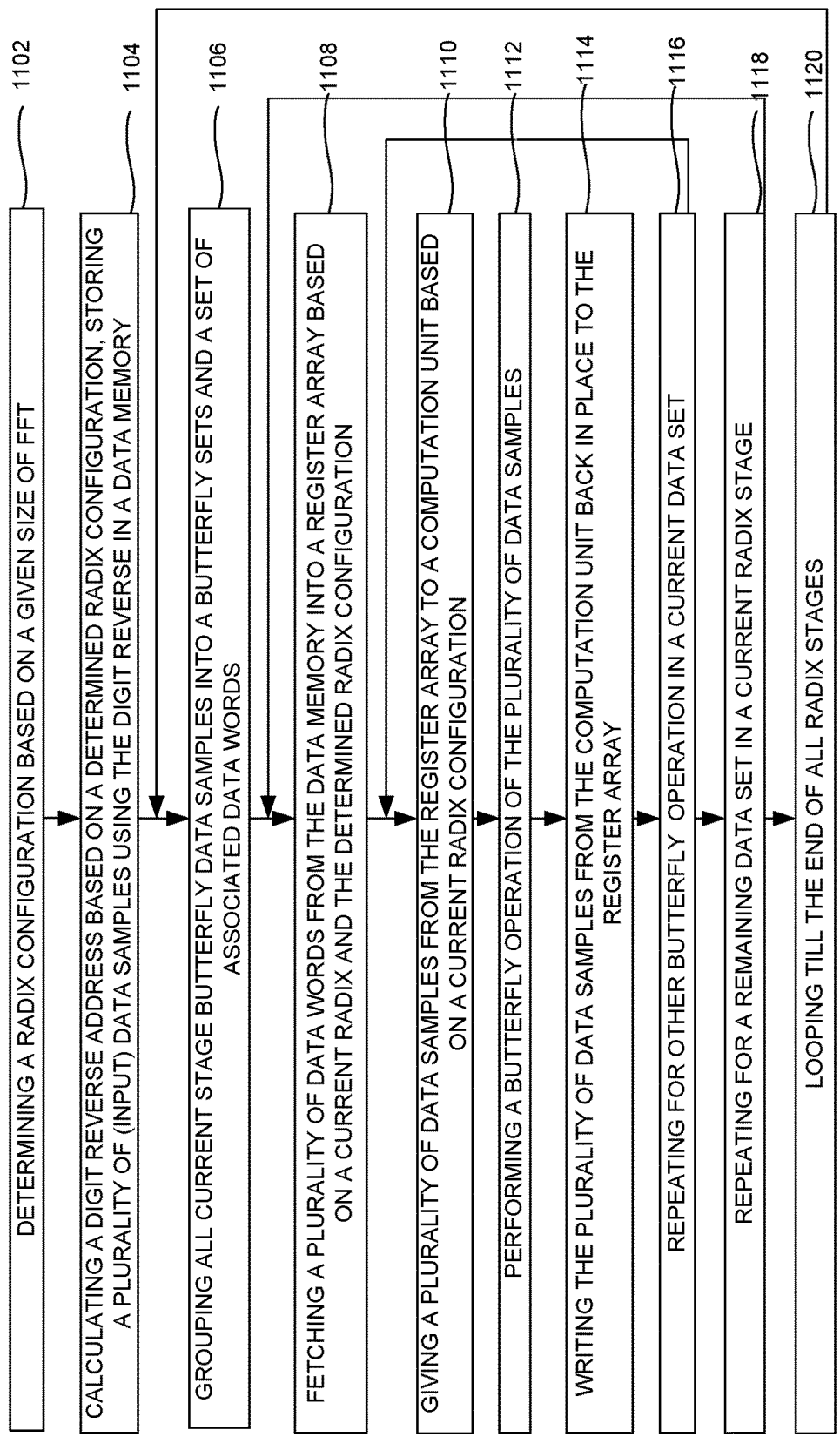
FIG. 11 illustrates a method of optimizing a mixed-radix FFT and IFFT according to an embodiment herein.

FIG. 11 illustrates a method of optimizing a mixed-radix FFT and IFFT according to an embodiment herein. In an embodiment, at step 1102, a radix configuration is determined based on given size of FFT. At step 1104, a digit reverse address is calculated based on a determined radix configuration (using the digit-reverse address generator 204). A plurality of (input) data samples is stored using the digit reverse address in the data memory 206. At step 1106, all current stage butterfly data samples are grouped into a butterfly set and a set of associated data words. At step, 1108, a plurality of data words from the data memory 206 is fetched into the register array 208 based on a current radix and the determined radix configuration. At step, 1110, a plurality of data samples from the register array 208 is given to the computation unit 216 based on the current radix configuration. In step 1112, a butterfly operation of the plurality of data samples is performed (For example using the computation unit 216). At step, 1114, the plurality of data samples from the computation unit 216 are written back in place to the register array 208. At step, 1116, other butterfly operation in a current dataset is repeated. Computed data words for current data set in the register array 208 is stored to the data memory 206. At step, 1118, a remaining data set in a current radix stage is repeated. At step 1120, looping is repeated till the end of all radix stages.

The system and method disclosed herein enables maximum (100%) utilization of memory, which is realized using a single port, single bank memory of size N samples that is used to store input, intermediate and output FFT data samples. Multiple samples are packed in one word of memory, where transactions with memory are at word level. The input data is stored in the digit reverse manner in the single port single bank memory and the in-place computations are performed on this digit reversed data. Further, in the system of the present disclosure the digit reverse index calculation is performed without using any multipliers. The control unit 210 identifies butterfly operations, based on radix of the stage and generates address for fetching data from single port single bank memory into register arrays 208. The register arrays 208 act as caches for holding data and enable computation unit 216 to be always busy. The control unit 210 also generates address for fetching the twiddle factor data, based on radix configuration. In the system disclosed herein three register banks are used to support pipelined operation. In case of radix-5, each register bank contains 5 lines, and each line has 6 complex samples in them. The computation unit 216 data path consists of multipliers and adders and the computation unit 216 performs different radix computation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A system for implementing a mixed radix fast fourier transformation using a single port single bank data memory, said system comprising
    a data source that provides an input data;
    an address generator that (a) processes said input data to
        (i) generate an index for a given radix configuration and a given size of a fast Fourier transformation (FFT), or
        (ii) generate an index for said given radix configuration and a given size of an inverse fast Fourier transformation (IFFT);
    said single port single bank data memory that stores said input data (i) in an order based on the address generator and stores outputs of intermediate stages of FFT and final output of FFT in normal order for decimation in time fast Fourier transform (DIT-(I)FFT), and (ii) in a normal order and stores said outputs of intermediate stages of FFT and final output of FFT in said order based on the address generator for decimation in frequency—fast Fourier transform (DIF-(I)FFT), wherein a plurality of samples are packed to a single memory data word in said single port single bank data memory;
    a register array that comprises a plurality of registers that are configured to cache multiple data words comprising intermediate values obtained from said single port single bank data memory;
    a control unit that identifies butterfly operations based on a radix of a current stage for a radix configuration, and generate addresses for fetching or storing data from said single port single bank data memory into said register array, wherein said control unit generates selected data word addresses for fetching data word from said single port single bank data memory and stores computed, immediate, and final results in said single port single bank data memory;
    a butterfly extraction unit that extracts data samples for said butterfly operations from said multiple data words from said register array based on a current radix and said radix configuration;
    a twiddle factor generator that stores at least one look up table (LUTs), wherein number of unique entries of said lookup table is reduced based on least common multiple of all possible multiples of twiddle factor sizes; and
    a computation unit that performs twiddle factor multiplications and said butterfly operations for said current radix, wherein an output of said computation unit is written back to said register array.

2. The system as claimed in claim 1, wherein said plurality of registers in said register array holds (i) said input data words that consists of multiple data samples, before sending said input data samples to said computation unit, and (ii) output data samples of said computation unit and before writing to said single port single bank data memory.

3. The system as claimed in claim 1, wherein said register array acts as a cache between said single port single bank data memory and said computation unit.

4. The system as claimed in claim 3, wherein said butterfly extraction unit (i) extracts said data samples for said butterfly operations and said butterfly operations computations are performed on said computation unit and (ii) stores output data samples in said register array and are written back to said single port single bank data memory.

5. The system as claimed in claim 4, wherein (i) selecting said data words from said single port single bank data memory, (ii) extracting said data samples for said butterfly operations for said computation unit, (iii) storing of output samples of the computation unit in said register array, and (iv) writing said data word back to said single port single bank data memory are performed in parallel and in a pipelined manner to maximize data bandwidth utilization of said single port single bank data memory and computation utilization of said computational unit.

6. The system as claimed in claim 1, wherein said look up table (LUT) in said twiddle factor generator stores a single quadrant of sine and cosine information.

7. The system as claimed in claim 1, wherein said computation unit supports multiple radix butterfly computations, wherein for long term evolution (LTE) said computation unit computes said FFT for (i) radix-2, (ii) radix-3, (iii) radix-4, and (iv) radix-5 configurations.

8. The system as claimed in claim 1, wherein said mixed radix FFT is computed by deriving at least one of a (i) number of said samples per said memory word, (ii) number of register arrays, (iii) number of parallel twiddle factors, and (iv) arrangement of said parallel twiddle factors.

9. A method for implementing a mixed radix fast Fourier transformation (FFT) using a single port single bank data memory, said method comprising:
   determining, using an address generator, (i) an index for a given radix configuration based on a given size of a Fast Fourier transformation (FFT), or (ii) an index for said given radix configuration and a given size of an inverse fast Fourier transformation (IFFT) by processing an input data provided from a data source;
   storing, said single port single bank data memory, said input data (i) in an order based on the address generator and stores outputs of intermediate stages of FFT and final output of FFT in normal order for decimation in time fast Fourier transform (DIT-(I)FFT), and (ii) in a normal order and stores said outputs of intermediate stages of FFT and final output of FFT in said order based on the address generator for decimation in frequency-fast Fourier transform (DIF-(I)FFT);
   grouping, using a control unit, all current stage butterfly data samples into a butterfly sets and a set of associated data words;
   determining, using a control unit, butterfly operations based on a radix of a current stage for a radix configuration, and generate addresses for fetching or storing data from said single port single bank data memory into said register array;
   determining, using said control unit, selected data word addresses for fetching a plurality of data words from said single port single bank data memory into a register array based on a current radix and said determined radix configuration, and stores computed, immediate, and final results in said single port single bank data memory;
   storing, using a twiddle factor generator, at least one look up table (LUTs), wherein number of unique entries of said lookup table is reduced based on least common multiple of all possible multiples of twiddle factor sizes;
   performing, using a computation unit, twiddle factor multiplications and a butterfly operation of said plurality of data samples;
   writing said plurality of data samples from a computation unit, back in place to said register array; and
   performing an in place said data word write back from said register array to said single port single bank data memory.

10. The method as claimed in claim 9, comprising, for a second and subsequent radix stage;
    fetching said plurality of data words from said single port single bank data memory to said register array based on a current radix and, said determined radix configuration;
    giving said plurality of data samples from said register array to the computation unit, wherein said plurality of data samples is determined based on said current radix and a sequential radix position in said determined radix configuration;
    performing a twiddle factor multiplication and a butterfly operation of said plurality of data samples;
    writing said plurality of data samples from said computation unit back in place to said register array; and
    writing said data words from said register array into said single port single bank data memory.

11. The method as claimed in claim 10, wherein a first radix stage and a second radix stage are selected from (i) radix-2, (ii) radix-3, (iii) radix-4, and (iv) radix-5 configurations, wherein said butterfly operations are completed for each radix stage of said FFT.

12. The method as claimed in claim 9, further comprising;
    fetching selected said data words from said single port single bank data memory to one or more register arrays;
    extracting said butterfly data samples from a butterfly extraction unit, wherein butterfly computations are performed in said computation unit;
    storing computed results in said register array using said butterfly extraction unit; and
    writing said computed results from said register array back to said single port single bank data memory.

13. The method as claimed in claim 12, wherein said (i) fetching selected said data words from said single port single bank data memory to one or more register arrays, (ii) extracting said butterfly data samples from said butterfly extraction unit, wherein butterfly computations are performed in said computation unit, (iii) storing computed results in said register array using said butterfly extraction unit, and (iv) writing said computed results from said register array back to said single port single bank data memory, are performed in parallel.

14. The method as claimed in claim 9, further comprising repeating said steps of (i) said giving said plurality of data samples from said register array to said computation unit, (ii) said performing a butterfly operation of said plurality of data samples, and (iii) said writing data samples from said computation unit back in place to said register array for other butterfly operations.

15. The method as claimed in claim 9, further comprising repeating said steps of (i) said fetching plurality of data words from said single port single bank data memory into a register array based on a current radix and said determined radix configuration, (ii) said giving said plurality of data samples from said register array to said computation unit, (iii) said performing a butterfly operation of said plurality of data samples, and (iv) said writing data samples from said computation unit back in place to said register array for a remaining data set in said current radix stage.

16. The method as claimed in claim 9, further comprising looping said steps of (i) said grouping of all current stage butterfly data samples in to a butterfly set and a set of associated data words, (ii) said fetching said plurality of data words from said single port single bank data memory into a register array based on a current radix and said determined radix configuration, (iii) said giving said plurality of data samples from said register array to said computation unit, (iv) said performing a butterfly operation of said plurality of data samples, and (v) said writing data samples from said computation unit back in place to said register array till the end of all radix stages.

* * * * *